(12) United States Patent
Kamgaing et al.

(10) Patent No.: US 10,819,445 B2
(45) Date of Patent: Oct. 27, 2020

(54) WAVEGUIDE AND TRANSCEIVER INTERFERENCE MITIGATION

(71) Applicant: Intel Corporation, Santa Clara, CA (US)

(72) Inventors: Telesphor Kamgaing, Chandler, AZ (US); Georgios Dogiamis, Chandler, AZ (US); Henning Braunisch, Phoenix, AZ (US); Hyung-Jin Lee, Portland, OR (US); Richard Dischler, Bolton, MA (US)

(73) Assignee: Intel Corporation, Santa Clara, CA (US)

( * ) Notice: Subject to any disclaimer, the term of this patent is extended or adjusted under 35 U.S.C. 154(b) by 60 days.

(21) Appl. No.: 16/196,367

(22) Filed: Nov. 20, 2018

(65) Prior Publication Data

US 2019/0089409 A1    Mar. 21, 2019

(51) Int. Cl.
| | | |
|---|---|---|
| *H04B 15/04* | (2006.01) | |
| *H04B 3/52* | (2006.01) | |
| *H04B 1/52* | (2015.01) | |
| *H04B 3/56* | (2006.01) | |
| *H04B 1/525* | (2015.01) | |

(52) U.S. Cl.
CPC .............. *H04B 15/04* (2013.01); *H04B 1/52* (2013.01); *H04B 1/525* (2013.01); *H04B 3/52* (2013.01); *H04B 3/56* (2013.01)

(58) Field of Classification Search
CPC . H04B 3/52; H04B 1/52; H04B 1/525; H04B 3/56; H04B 15/04
USPC .......................................................... 333/24
See application file for complete search history.

(56) References Cited

U.S. PATENT DOCUMENTS

| | | | | |
|---|---|---|---|---|
| 5,543,653 | A * | 8/1996 | Grubisich ........... | H01L 27/0623 257/593 |
| 2004/0069984 | A1* | 4/2004 | Estes ..................... | B82Y 10/00 257/25 |
| 2014/0042463 | A1* | 2/2014 | Uemura ................. | H01L 31/12 257/80 |
| 2019/0199441 | A1* | 6/2019 | Bai ....................... | H01L 23/481 |
| 2019/0222318 | A1* | 7/2019 | Bai ....................... | H04B 10/40 |

OTHER PUBLICATIONS

Excerpt from the webpage of the assignee of the US PGPub US 20190199441, Wingcomm Technology Co. Ltd., Feb. 2019. (Year: 2019).*
Matsumoto, "Encyclopedia of Materials: Science and Technology", taken from Science Direct, published by Elsevier Science Ltd, 2001 (Year: 2001).*

* cited by examiner

*Primary Examiner* — Benny T Lee
*Assistant Examiner* — Hafizur Rahman
(74) *Attorney, Agent, or Firm* — Patent Capital Group (57) ABSTRACT

Embodiments may relate to a transceiver chip. The transceiver chip may include a substrate that has a first transceiver component and a second transceiver component positioned therein. The transceiver chip may further include a well material that is positioned between the first transceiver component and the second transceiver component. The well material may mitigate cross-talk between the first transceiver component and the second transceiver component. Other embodiments may be described or claimed.

19 Claims, 6 Drawing Sheets

WAVEGUIDE AND TRANSCEIVER INTERFERENCE MITIGATION

BACKGROUND

Waveguides may transmit data using electromagnetic waves. In some cases, the electromagnetic waves may operate in the radio frequency spectrum. For example, some electromagnetic waves in the radio frequency spectrum may have frequencies on the order of several hundred gigahertz (GHz), to a terahertz (THz), or above. More specifically, some electromagnetic waves may operate in what is referred to as the millimeter-wave (mmWave) spectrum, which may include frequencies between approximately 30 GHz and approximately 300 GHz.

One concern in transferring big data using electromagnetic waves in the radio frequency spectrum with frequencies on the order of millimeter-wave (mmWave) may be that cross-talk may occur between co-existing high-speed links. This cross-talk may occur at the die-level, where the different transceiver chains are co-integrated. The cross-talk may degrade the signal integrity, and may reduce the die-level bandwidth density as the circuits are spread out to achieve a minimum isolation. The cross-talk may even lead to false signaling on inactive links.

DETAILED DESCRIPTION

In the following detailed description, reference is made to the accompanying drawings which form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A or B" means (A), (B), or (A and B). For the purposes of the present disclosure, the phrase "A, B, or C" means (A), (B), (C), (A and B), (A and C), (B and C), or (A, B and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or elements are in direct contact.

In various embodiments, the phrase "a first feature formed, deposited, or otherwise disposed on a second feature," may mean that the first feature is formed, deposited, or disposed over the feature layer, and at least a part of the first feature may be in direct contact (e.g., direct physical or electrical contact) or indirect contact (e.g., having one or more other features between the first feature and the second feature) with at least a part of the second feature.

Various operations may be described as multiple discrete operations in turn, in a manner that is most helpful in understanding the claimed subject matter. However, the order of description should not be construed as to imply that these operations are necessarily order dependent.

As used herein, the term "module" may refer to, be part of, or include an application specific integrated circuit (ASIC), an electronic circuit, a processor (shared, dedicated, or group) or memory (shared, dedicated, or group) that execute one or more software or firmware programs, a combinational logic circuit, or other suitable components that provide the described functionality.

Embodiments herein may be described with respect to various Figures. Unless explicitly stated, the dimensions of the Figures are intended to be simplified illustrative examples, rather than depictions of relative dimensions. For example, various lengths/widths/heights of elements in the Figures may not be drawn to scale unless indicated otherwise. Additionally, some schematic illustrations of example structures of various devices and assemblies described herein may be shown with precise right angles and straight lines, but it is to be understood that such schematic illustrations may not reflect real-life process limitations which may cause the features to not look so "ideal" when any of the structures described herein are examined, e.g., using scanning electron microscopy (SEM) images or transmission electron microscope (TEM) images. In such images of real structures, possible processing defects could also be visible, e.g., not-perfectly straight edges of materials, tapered vias or other openings, inadvertent rounding of corners or variations in thicknesses of different material layers, occasional screw, edge, or combination dislocations within the crystalline region, and/or occasional dislocation defects of single atoms or clusters of atoms. There may be other defects not listed here but that are common within the field of device fabrication.

Embodiments herein may relate to die-level isolation techniques that enable high-density integration. These techniques may allow for increased die-level bandwidth density. Specifically, one or more embedded deep wells to improve radio frequency (RF)-isolation of various transceiver components within a chip or package. Additionally, through-substrate vias (TSVs) may be used in conjunction the embedded deep wells to further improve the RF-isolation. The TSVs may be extended with one or more backend interconnects to the bump-level of the chip, whereas the deep-well implants may be used for local isolation between the different transceiver components. The transceiver components may be, for example, two transceivers, or a transmit module and a receive module of a single transceiver.

The transceivers may be configured to send or receive electromagnetic signals in the RF range, and particularly in the millimeter-wave (mmWave) and THz frequency range. As used herein, the mmWave range may refer to signals with a frequency between approximately 30 GHz and approximately 300 GHz. This electrical coupling may be based at least in part on the lower effective impedance through a multiple junction network in front-end structures of the chip. Therefore, strong and low resistive grounding access underneath entire building blocks in the substrate area may significantly improve electrical isolation of the transceiver components within the substrate.

As a result of embodiments herein, the cross-talk between the transceiver components may be mitigated. Improved signal integrity as a result of the cross-talk mitigation may result in both cost and power efficiencies. These efficiencies may be more pronounced in relatively dense circuit designs. Additionally, the TSV shielding on the side of the die where the transceiver components are may provide thermal isolation and heat dissipation paths for a power amplifier (PA) within the die. These thermal solutions may improve overall device reliability by avoiding excessive heat within the die.

At a more general level, multi-chain transceivers may be used for phased array antennas. In these use cases, phase shifting may be used to enable spatial combining or beam forming. In these applications, the multi-chain transceiver may include a plurality of transceiver components that operate at a same or similar frequency, but at different phases from one another. These transceiver components may be implemented on the same silicon substrate.

For waveguide interconnects, multi-chain transceivers may be used for channelization (e.g., dispersion mitigation solutions) or to increase the overall bandwidth density. In those emergent applications, the individual chains (i.e., the individual transceiver components) of the multi-chain transceivers may operate at the same frequency as one another, or at different frequencies from one another.

Figure 1:
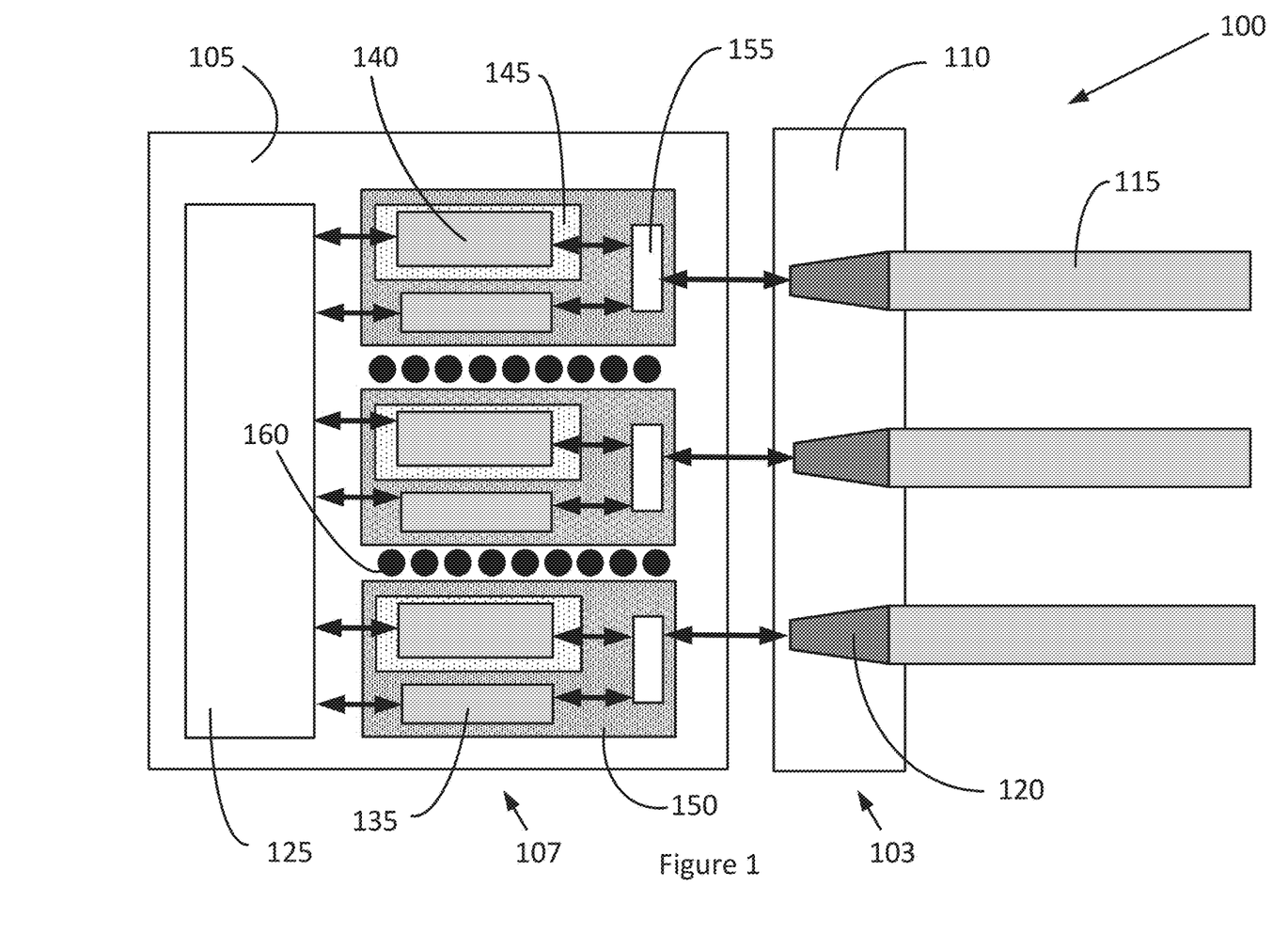
FIG. 1 illustrates a simplified top-down view of an example system that includes a deep-well portion, in accordance with various embodiments.

FIG. 1 illustrates a simplified top-down view of an example system 100 that may include a plurality of deep-well portions, and a plurality of TSVs, in accordance with various embodiments. FIG. 1 may be described with respect to specific elements and numerals, however not every element of FIG. 1 is enumerated for the sake of clarity of the Figure. Unenumerated elements may be generally assumed to have similar or identical characteristics to enumerated elements as discussed herein.

The system 100 may include a chip 107 that is coupled with a package 103. The package 103 may include a substrate 110. The substrate 110 may be, for example, an organic or an inorganic substrate. In some embodiments, the substrate 110 may include one or more elements such as vias, traces, logical components, or some other element placed within or on the substrate 110.

The package 103 may further include one or more wave launchers 120, which are communicatively coupled with one or more waveguides 115. For example, as shown in FIG. 1, the package 103 may include three wave launchers 120, and each wave launcher 120 may be coupled with a waveguide 115. The wave launchers 120 may be a component of the system 100 that is configured to receive a data signal from a chip such as chip 107, and convert the data signal into an electromagnetic wave which may then be provided to the waveguide 115. Similarly, the wave launchers 120 may receive an electromagnetic wave from a waveguide 115, and convert the wave to signals which may then be provided to the chip 107. In embodiments, the wave launchers 120 may be, for example, opposing plates of a metal such as copper, or some other type of wave launcher.

The chip 107 may generally be considered to be a transceiver chip. The chip 107 may include a substrate 105. In embodiments, the substrate 105 may include silicon, III-V materials such as gallium nitride (GaN), gallium arsenide (GaAs), indium phosphide (InP), or non-semiconducting materials such as glass or ceramic.

The chip 107 may include a plurality of components either mounted on, or in, the substrate 105. One such component may include a digital component 125. The digital component 125 may be, for example, a processing unit such as a central processing unit (CPU), a general processing unit (GPU), or some other type of processing unit. Additionally, although the digital component 125 is only depicted as a single element, in some embodiments the digital component 125 may include a plurality of elements coupled together, such as a plurality of processing units or a plurality of chiplets of a disaggregated processing unit. Generally, the digital component 125 may be configured to perform one or more processing or logic functions on data, and other receive data from, or output data to, one or more elements of the chip 107.

The digital component 125 may be communicatively coupled with the plurality of transceiver components 140 and 135. In some embodiments, the transceiver components 140 and 135 may be transceivers. That is, the transceiver components 140 and 135 may be configured to both transmit and receive data from the digital component 125 or the switch 155, as discussed in further detail below. Alternatively, adjacent transceiver components 140 and 135 may together form a transceiver pair that performs the functions of a transceiver. For example, transceiver component 140 may be a transmitter, and transceiver component 135 may be a receiver, or vice versa. For example, if transceiver component 140 is a transmitter, then the transmitter may be configured to receive the signal from digital component 125, and forward the signal to the switch 155. Conversely, if transceiver component 135 is a receiver, it may be configured to receive one or more data signals from the switch 155, and forward the signal to digital component 125. In embodiments, the transceiver components 135 may be a chip that includes elements such as transmit parts, receive parts, etc. Specifically, the transmit part of the transceiver may include (1) a digital to analog converter (DAC) that converts the digital data in a first analog signal; (2) an up-convert mixer that utilizes an on-chip or off-chip generated local-oscillator (LO) signal to up-convert the first analog signal into a mmWave or a THz signal and (3) a power amplifier that increases the signal level prior to coupling it into the waveguide launcher. Additionally, the transmitter may perform other operations including signal pre-distortion or shaping before the signal is coupled into the waveguide launcher. The receive part of the transceiver may include (1) a low noise amplifier (LNA) that amplifies the signal received from the waveguide launcher, (2) a down convert mixer that down converts the mmWave/THz signal into a first analog signal and (3) an ADC (analog to digital converter) that further converts the analog signal into a digital signal. One or both of the transmit and the receive part may use architecture that relies either on direct conversion or on a first conversion to an intermediate frequency.

As noted previously, the transceiver components 140 and 135 may be communicatively coupled with a switch 155. The switch 155 may control signal flow between the transceiver components 140/135 and the package 103. Specifically, as seen in FIG. 1, a plurality of transceiver components 135 and 140 may be coupled with a single switch 155, and the switch may be coupled with a single wave launcher 120. In this manner, the switch 155 may control signal transfer from one or more of the transceiver components 135/140. To do so, the switch 155 may include a buffer or some other type of storage to store signals received from a transceiver 135/140. Additionally, the switch 155 may receive a signal from a wave launcher 120, and provide that signal to an appropriate transceiver component 135/140. The switch 155 may do so by using, for example, a header portion of the data or some other type of identification/addressing technique. In embodiments, the switch 155 may be implemented as hardware, software, firmware, or some combination thereof. It will be understood that although a switch 155 is depicted as coupled with only two transceiver components 135/140 and a single wave launcher 120, in other embodiments the switch 155 may be coupled with more or fewer transceiver components 135/140, or more wave launchers 120.

The substrate may further include a plurality of well portions 150 and 145. The well portions 145/150 may be formed of an n-doped or p-doped portion of the substrate. For example, the wells 145/150 may be doped with boron, arsenic, phosphorus, gallium, or some other suitable dopant. Generally, as used herein, "doping" may refer to a presence of the dopant in the doped material. Generally, there may be between approximately 10e14 and 10e19 atoms of the dopant per cubic centimeter of the doped material.

As can be seen, certain of the wells such as well 145 may only surround a single one of the transceiver components 140. In this way, the well 145 may electromagnetically isolate the transceiver component 140 from transceiver component 135. Additionally or alternatively, a well 150 may generally surround a pair of transceiver components 135/140. In this way, the well 150 may electromagnetically isolate the transceiver components 135/140 from another pair of transceiver components 135/140. Specifically, the n-doped or p-doped well material may serve to either stop or significantly reduce the propagation of stray electromagnetic signals from one or more transceiver components 135/140 through the substrate 105. In this way, the above-described advantages of embodiments herein may be achieved.

Additionally, the substrate 105 may include one or more TSVs 160. As shown in FIG. 1, the TSVs 160 may be positioned between a pair of transceiver components 135/140, however in other embodiments the TSVs 160 may additionally or alternatively be positioned between transceiver components 135 and 140. The TSVs 160 may be, for example, plated vias or some other type of via which may be formed by mechanical, optical, or chemical etching, or some other technique. The TSVs 160 may include or be filled with a material such as copper, aluminum, or some other type of metal or metal alloy. In general, the TSVs 160 may serve to further electromagnetically isolate adjacent transceiver components 135/140 from one another.

As can be seen in FIG. 1, the TSVs 160 may be positioned between two of the pairs of transceivers 135/140 and their associated wells 145/150. However, in some other cases there may be no TSVs 160. Such an example may be depicted below in FIG. 4. Generally, various embodiments may have various numbers of, or arrangements of, TSVs such as TSVs 160. For example, in some embodiments there may be TSVs between each set of transceiver components. In other embodiments, the chip may not include TSVs between any sets of transceiver components. The selection of whether to include TSVs may be based on factors such as manufacturing costs, material selection, degree of cross-talk mitigation desired, size constraints of the chip 107, etc.

Figure 2:
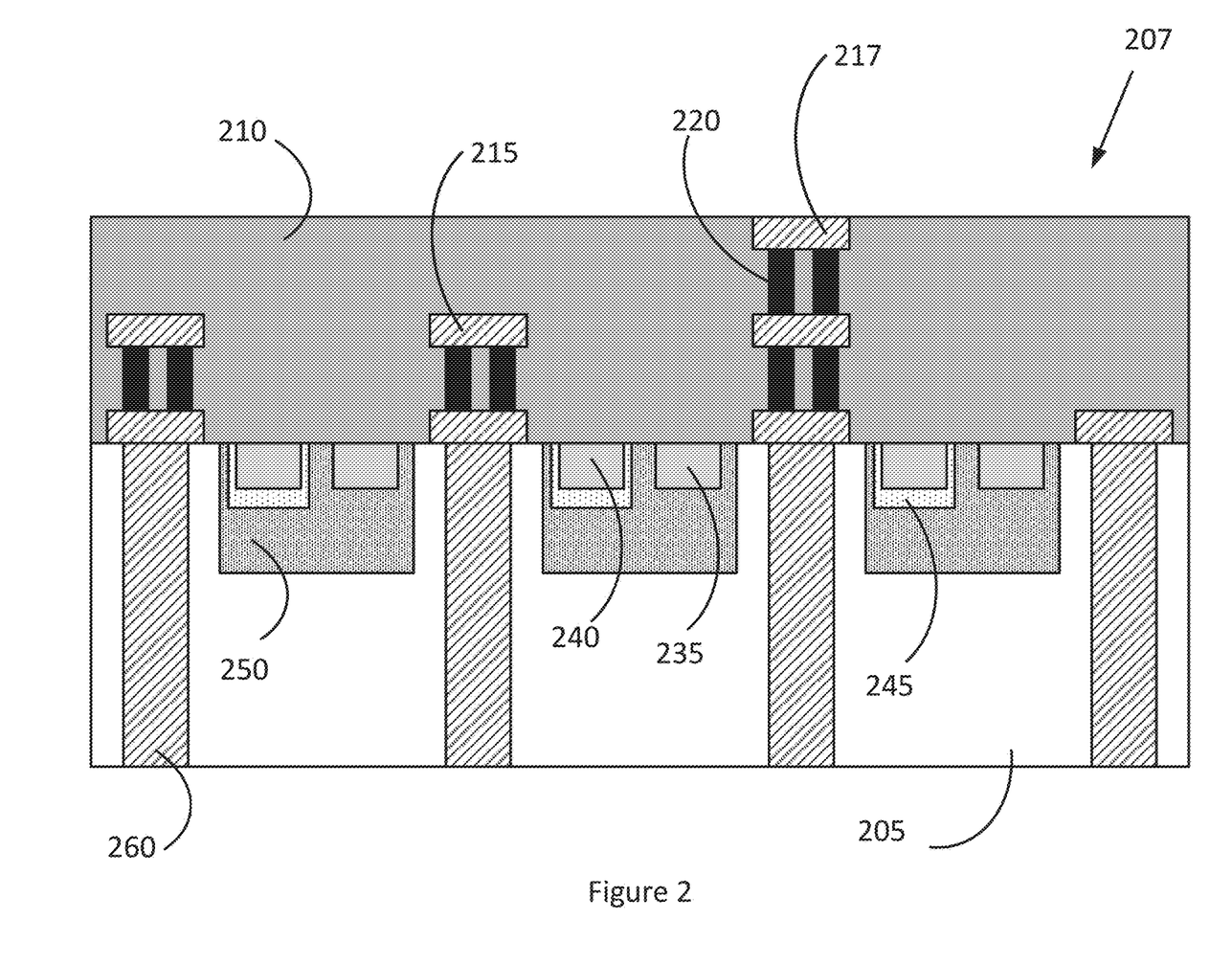
FIG. 2 illustrates a simplified side-on view of an example chip that includes a deep-well portion, in accordance with various embodiments.

FIG. 2 illustrates a simplified side-on view of an example chip 207 that includes a plurality of deep-well portions, in accordance with various embodiments. Generally, the chip 207 may be considered to be a side-on view of a chip such as chip 107, and may include similar elements. Specifically, the chip 207 may include a substrate 205, one or more transceiver components 235/240, TSVs 260, and wells 245/250, which may be respectively similar to substrate 105, transceiver components 135/140, TSVs 160, and wells 145/150.

The chip 207 may also include an inter-layer dielectric (ILD) 210. The ILD may be, for example, a dielectric material such as silicon dioxide, polyimide, silicon nitride, or some other type of material, Generally, the ILD 210 may be at the "front side" or "active side" of the chip 207, and the opposite side of the chip 207 where one or more TSVs 260 may be exposed by the substrate 205 may be considered the "back side" of the chip. In some embodiments, the back side of the chip 207 may include a passivation layer and a metallization layer. Generally, the passivation layer may be used to route a signal on the die back side, while preventing the signal line from coming in contact with the substrate 205. The metallization layer may be used for additional shielding or for contact with a thermal solution, as discussed in detail below.

The ILD may include one or more pads such as pads 215 and 217, and one or more micro-vias 220. The micro-vias 220 may be, for example, plated vias or some other type of vias that include a conductive material such as copper and allow electrical or thermal communication through the ILD 210. The pads 215/217 may be conductive pads of a material such as copper, gold, etc. Generally, the pads 215/217 may be coupled with one or more traces, vias, or other components within the ILD 210 which may not be shown for the sake of clarity of the Figure. In some embodiments, one or more of the pads such as pad 217 may be flush with, or at least partially extend from, the surface of the ILD 210. A separate element may be communicatively coupled with the pad 217, and therefore be communicatively coupled with one or more elements within the chip 207. Additionally or alternatively, a thermal solution such as a heat sink, vapor chamber, heat spreader, etc. may be coupled with the back side of the substrate 205. The thermal solution may provide a thermal route to allow heat to escape from the chip 207 to the thermal solution.

As can be seen in FIG. 2, the wells 245 may serve to generally surround and electrically insulate transceiver component 240 from transceiver component 235. Similarly, the well 235 may serve to isolate a first pair of transceiver components 235/240 from a second pair of transceiver components 235/240.

Figure 3:
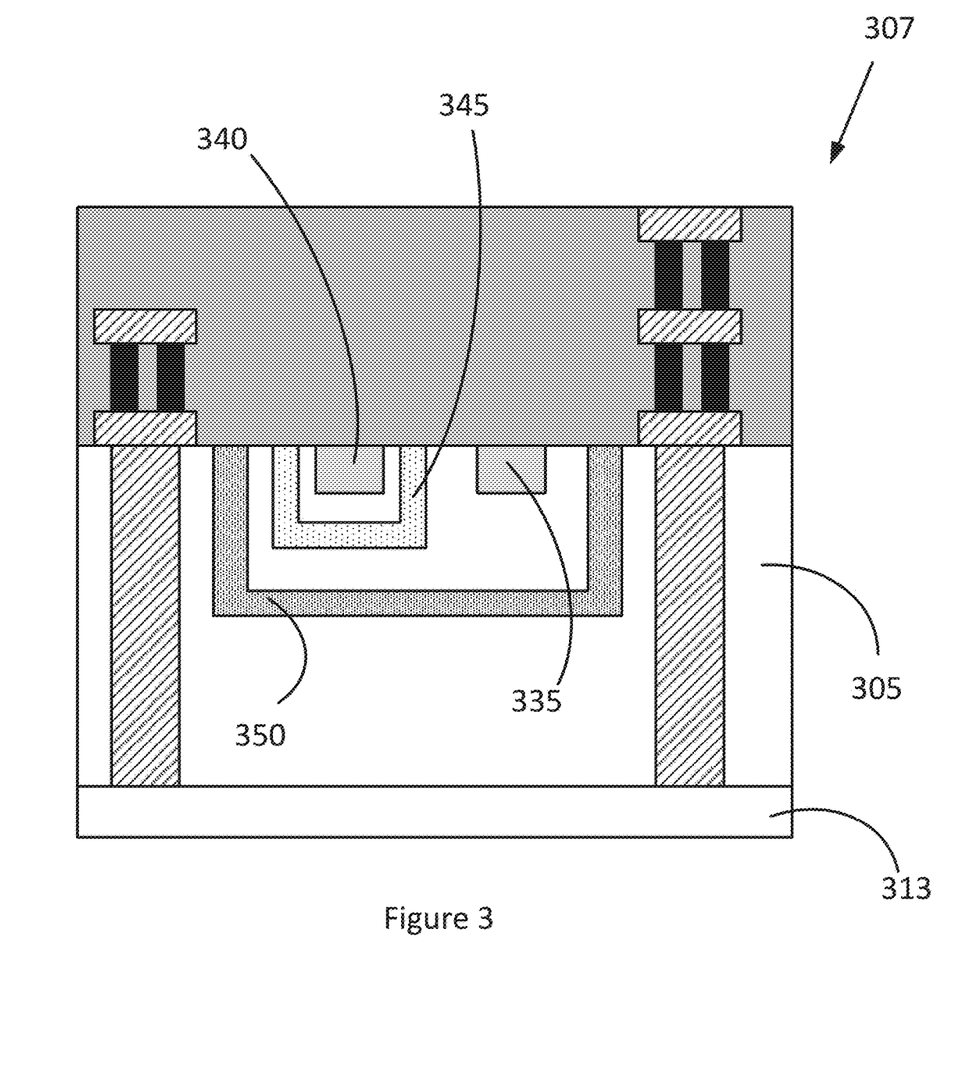
FIG. 3 illustrates an alternative simplified side-on view of an example chip that includes a deep-well portion, in accordance with various embodiments.

FIG. 3 illustrates an alternative simplified side-on view of an example chip 307 that includes a deep-well portion, in accordance with various embodiments. The chip 307 may be similar to chip 207, and include similar elements. The dimensions of FIG. 3, and the number of components depicted in FIG. 3, may be different than those depicted in FIG. 2 for the sake of clearly illustrating portions of the Figure. Additionally, certain elements may be depicted in FIG. 3 but not specifically enumerated for the sake of lack of redundancy.

The chip 307 may include a plurality of transceiver components 335/340 and a substrate 305, which may be respectively similar to transceiver components 235/240 and substrate 205. The chip 307 may further include a backside metallization layer 313. The backside metallization layer 313 may include, for example, copper, aluminum, gold, conductive epoxy. Generally, the backside metallization layer may be used to enable use of a metallic thermal interface material (TIM) such as indium (which may be referred to as a solder TIM (STIM)).

The chip 307 may also include a plurality of wells 345 and 350. Well 345 may be similar to well 245 or 145 and, for example, include a similar material to wells 145/245. Similarly, well 350 may be similar to wells 150/250, and include material similar to those wells. However, as can be seen in FIG. 3, the wells 345/350 may not occupy the entirety of the space around the transceiver components 335/340. In other words, the wells 345/350 may generally surround, but not be directly physically coupled with, the transceiver components 335/340. Rather, the substrate 305 may be in direct physical contact with one or more of the transceiver components 335/340, and the wells 345 may generally be a doped layer disposed within the substrate 305 on one or more sides of the transceiver components 335/340 as illustrated in FIG. 3.

Figure 4:
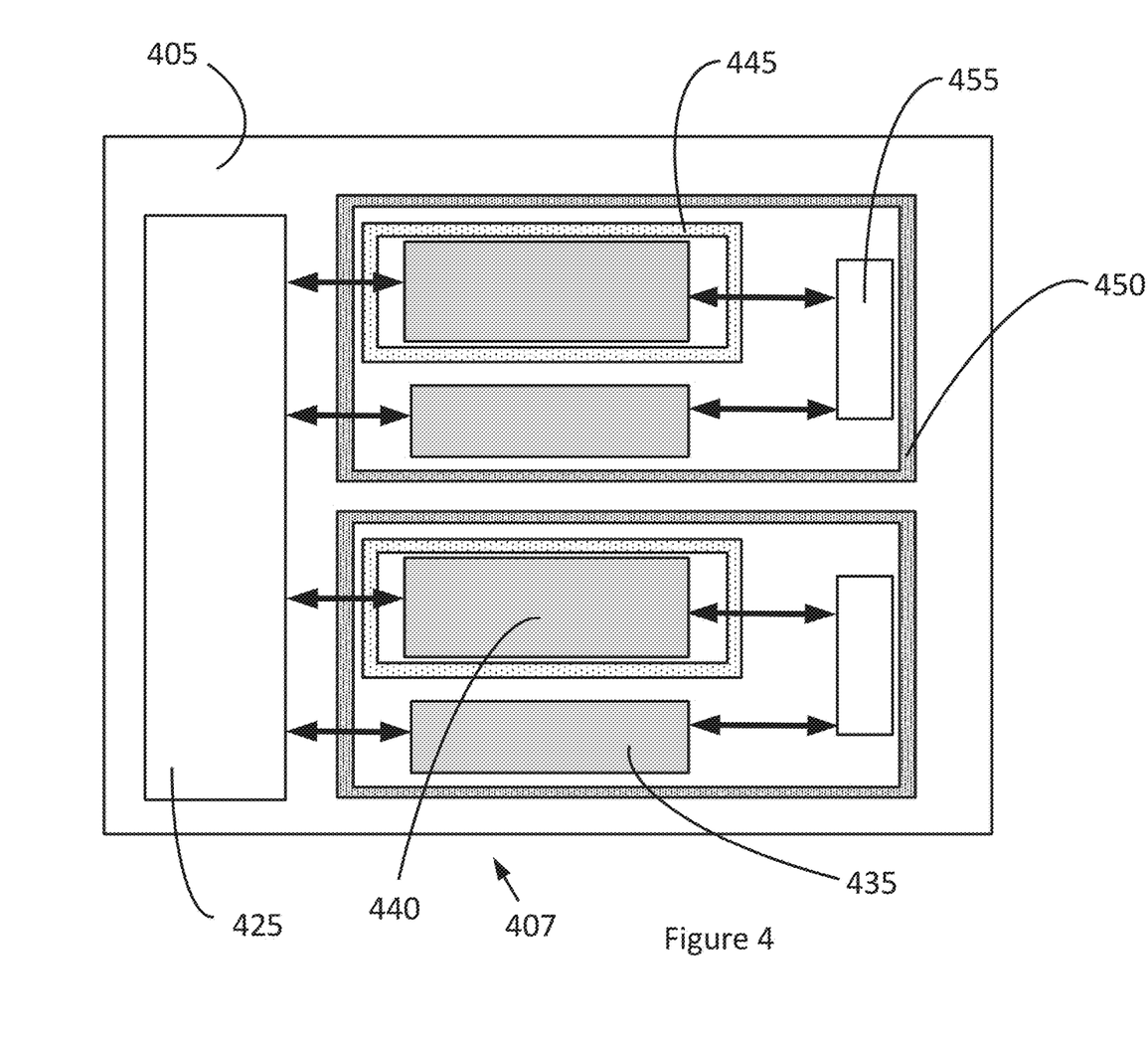
FIG. 4 illustrates an alternative simplified top-down view of an example chip that includes a deep-well portion, in accordance with various embodiments.

FIG. 4 illustrates an alternative simplified top-down view of an example chip 407 that includes a deep-well portion, in accordance with various embodiments. Specifically, the chip 407 may include a substrate 405, a digital component 425, one or more switches 455, and one or more transceiver components 435/440 which may be respectively similar to substrate 105, digital component 125, switch(es) 155, and transceiver components 135/140.

The chip 407 may further include one or more wells 445/450, which may be similar to wells 345/350. Specifically, as can be seen in FIG. 4, the wells 345/350 may not be physically coupled with the transceiver components 435/440. Rather, the wells 345/350 may be positioned within the substrate 405 and generally surrounding the transceiver components 135/140, and the substrate material may be physically coupled with, and generally positioned between, the wells 345/350 and the transceiver components 135/140.

This configuration of FIGS. 3 and 4 may present an advantage because the wells 345/350 are not physically coupled with one another. Specifically, such a configuration may allow the wells 345/350 to have the same doping as one another, or different doping from one another, without the wells themselves interacting.

As noted above, it will be understood that FIGS. 1-3 are intended to be highly simplified diagrams that depict various elements of embodiments herein. The specific relative sizes, shapes, cross-sections, or number of components may be considered to be depicted for the sake of example. For example, some embodiments may include only a single well rather than the two-well design depicted in the Figures. Other variations in number, dimensions, etc. may be present in other real-world embodiments.

Figure 5:
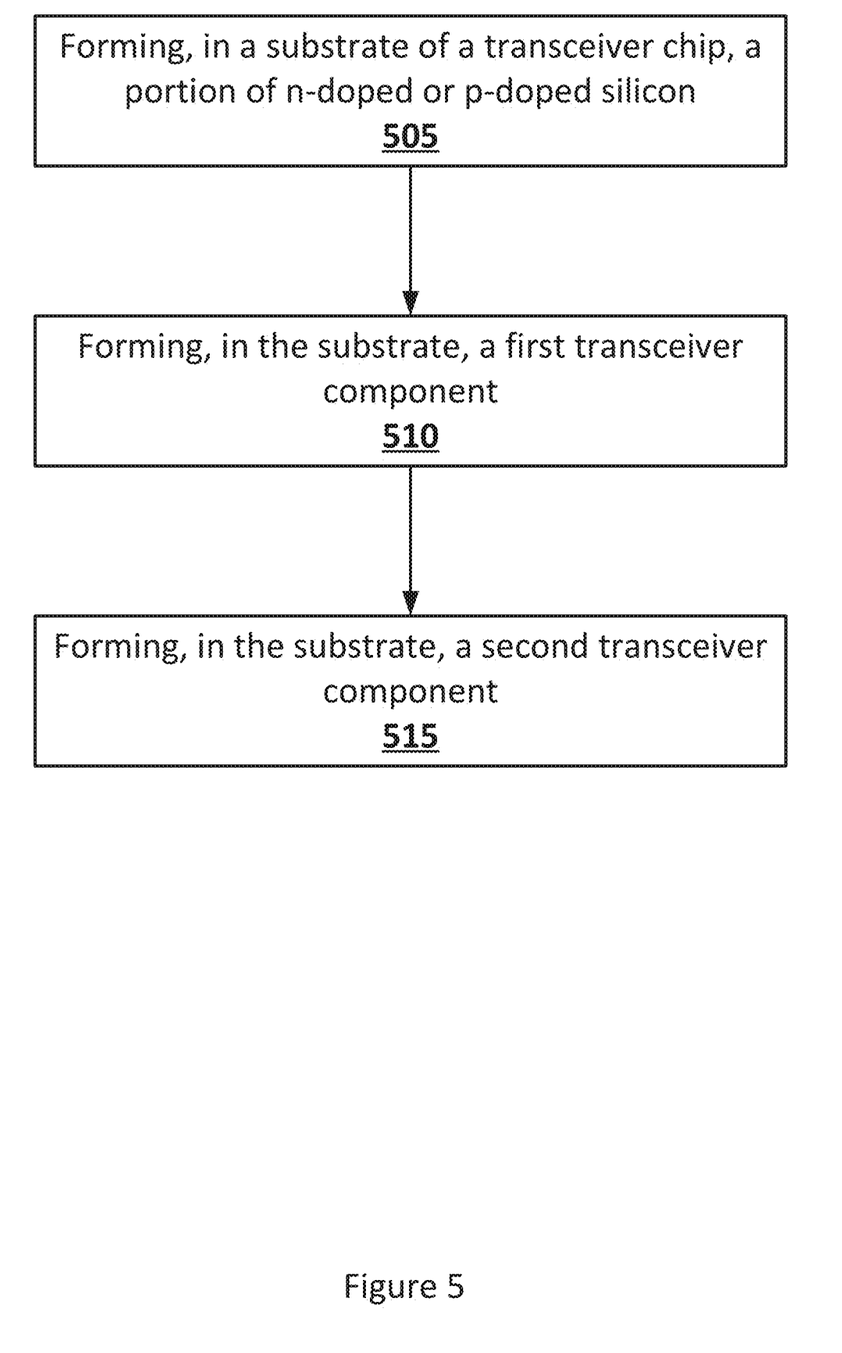
FIG. 5 illustrates a flow chart of a simplified technique for generating a chip with a deep-well portion, in accordance with various embodiments.

FIG. 5 illustrates a flow chart of a simplified technique for generating a chip with a deep-well portion, in accordance with various embodiments. Specifically, FIG. 5 may relate to a technique that may be used to generate a chip such as chips 107, 207, 307, or 407. The technique may include forming, at 505, in a substrate of a transceiver chip, a portion of n-doped or p-doped silicon. The portions of n-doped or p-doped silicon may be, for example, similar to wells 145/150/245/250/345/350/445/450 as discussed above. The portions of n-doped or p-doped silicon may be formed by, for example, ion implant followed by annealing. In some embodiments, the portions of the silicon may be a relatively larger portion such as the wells 145/150/245/250 depicted in FIGS. 1 and 2, or the portions of the silicon may be a layer within the silicon such as wells 345/350/445/450 depicted in FIGS. 3 and 4.

The technique may further include forming, in the substrate, a first transceiver component at 510 and forming, in the substrate, a second transceiver component at 515. The transceiver components at 510 and 515 may be similar to transceiver components 135/140/235/240/335/340/435/440 discussed above. The transceiver components may be formed by, for example, etching a cavity in the substrate and placing the transceiver components within the cavity or some other technique. Once the transceiver components are within the substrate, the first transceiver component and the second transceiver component may be electromagnetically shielded from one another by the portion of n-doped or p-doped silicon.

It will be understood that the technique discussed above with respect to FIG. 5 is intended as an example technique, and other embodiments may have more or fewer elements. In some embodiments, each of the n-doped and p-doped portions may be formed at 505 before formation of the transceiver components at 510/515, whereas in other embodiments a doped portion may be formed, a transceiver component may be placed in the substrate, and another doped portion may be formed. In some embodiments, the transceiver components at 510 and 515 may be formed generally concurrently with one another.

Figure 6:
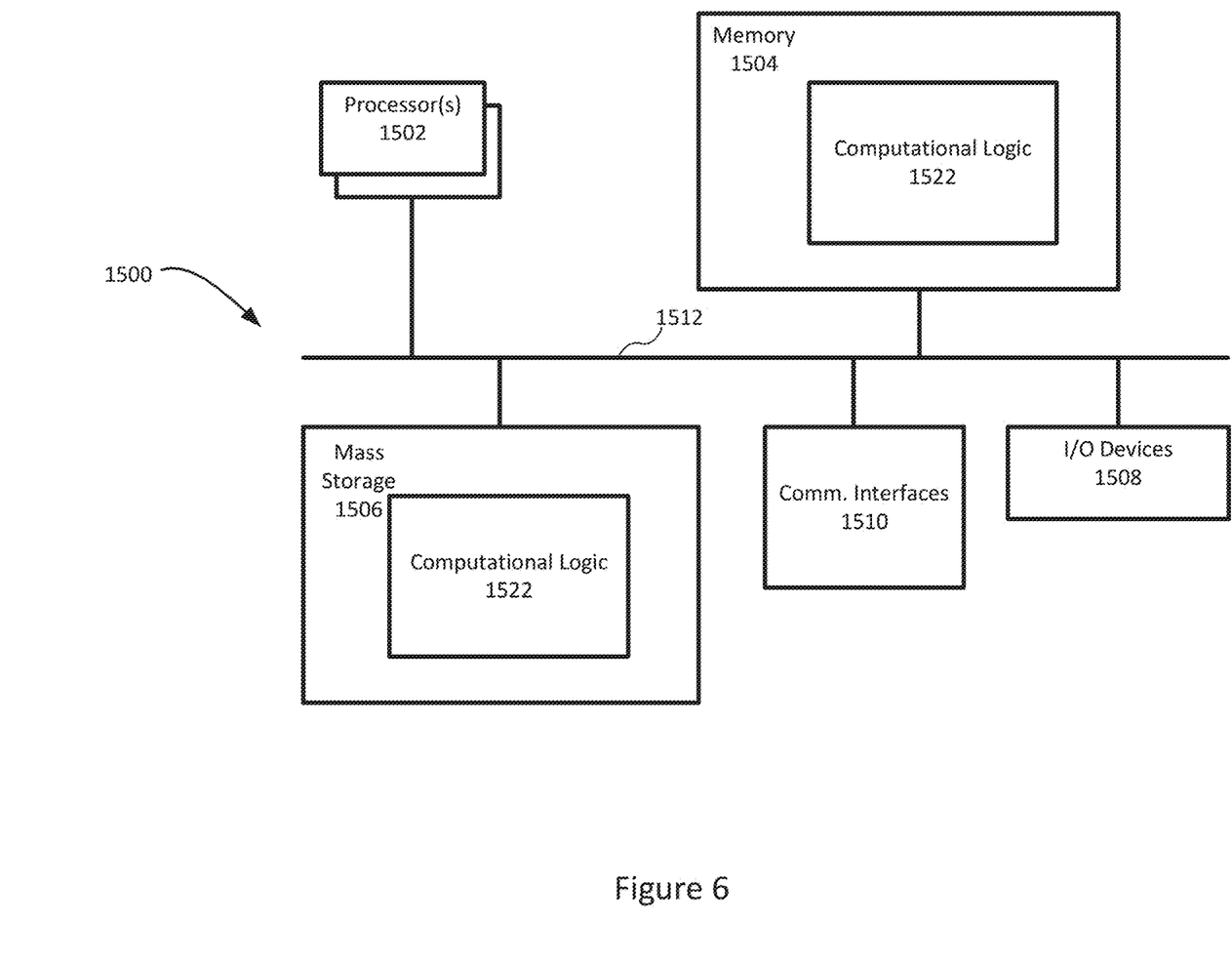
FIG. 6 illustrates an example device that may use various embodiments herein, in accordance with various embodiments.

FIG. 6 illustrates an example computing device 1500 suitable for use with chips 107, 207, 307, or 407 (collectively referred to as "chips 107-407"). As shown, computing device 1500 may include one or more processors or processor cores 1502 and system memory 1504. For the purpose of this application, including the claims, the terms "processor" and "processor cores" may be considered synonymous, unless the context clearly requires otherwise. The processor 1502 may include any type of processors, such as a CPU, a microprocessor, and the like. The processor 1502 may be implemented as an integrated circuit having multi-cores, e.g., a multi-core microprocessor. The computing device 1500 may include mass storage devices 1506 (such as diskette, hard drive, volatile memory (e.g., DRAM, compact disc read-only memory (CD-ROM), digital versatile disk (DVD), and so forth)). In general, system memory 1504 and/or mass storage devices 1506 may be temporal and/or persistent storage of any type, including, but not limited to, volatile and non-volatile memory, optical, magnetic, and/or solid state mass storage, and so forth. Volatile memory may include, but is not limited to, static and/or DRAM. Non-volatile memory may include, but is not limited to, electrically erasable programmable read-only memory, phase change memory, resistive memory, and so forth. In some embodiments, one or both of the system memory 1504 or the mass storage device 1506 may include computational logic 1522, which may be configured to implement or perform, in whole or in part, one or more instructions that may be stored in the system memory 1504 or the mass storage device 1506. In other embodiments, the computational logic 1522 may be configured to perform a memory-related command such as a read or write command on the system memory 1504 or the mass storage device 1506.

The computing device 1500 may further include input/output (I/O) devices 1508 (such as a display (e.g., a touchscreen display), keyboard, cursor control, remote control, gaming controller, image capture device, and so forth) and communication interfaces 1510 (such as network interface cards, modems, infrared receivers, radio receivers (e.g., Bluetooth), and so forth).

The communication interfaces 1510 may include communication chips (not shown) that may be configured to operate the device 1500 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 1510 may operate in accordance with other wireless protocols in other embodiments.

The computing device 1500 may further include or be coupled with a power supply. The power supply may, for example, be a power supply that is internal to the computing device 1500 such as a battery. In other embodiments the power supply may be external to the computing device 1500. For example, the power supply may be an electrical source such as an electrical outlet, an external battery, or some other type of power supply. The power supply may be, for example alternating current (AC), direct current (DC) or some other type of power supply. The power supply may in some embodiments include one or more additional components such as an AC to DC convertor, one or more downconverters, one or more upconverters, transistors, resistors, capacitors, etc. that may be used, for example, to tune or alter the current or voltage of the power supply from one level to another level. In some embodiments the power supply may be configured to provide power to the computing device 1500 or one or more discrete components of the computing device 1500 such as the processor(s) 1502, mass storage 1506, I/O devices 1508, etc.

The above-described computing device 1500 elements may be coupled to each other via system bus 1512, which may represent one or more buses. In the case of multiple buses, they may be bridged by one or more bus bridges (not shown). Each of these elements may perform its conventional functions known in the art. The various elements may be implemented by assembler instructions supported by processor(s) 1502 or high-level languages that may be compiled into such instructions.

The permanent copy of the programming instructions may be placed into mass storage devices 1506 in the factory, or in the field, through, for example, a distribution medium (not shown), such as a compact disc (CD), or through communication interface 1510 (from a distribution server (not shown)). That is, one or more distribution media having an implementation of the agent program may be employed to distribute the agent and to program various computing devices.

The number, capability, and/or capacity of the elements 1508, 1510, 1512 may vary, depending on whether computing device 1500 is used as a stationary computing device, such as a set-top box or desktop computer, or a mobile computing device, such as a tablet computing device, laptop computer, game console, or smartphone. Their constitutions are otherwise known, and accordingly will not be further described.

In various implementations, the computing device 1500 may comprise one or more components of a data center, a laptop, a netbook, a notebook, an ultrabook, a smartphone, a tablet, a personal digital assistant (PDA), an ultra mobile PC, a mobile phone, or a digital camera. In further implementations, the computing device 1500 may be any other electronic device that processes data.

In some embodiments, a chip such as chips 107-407 may be an element of a package that includes a component such as a processor 1502, memory 1504, mass storage 1506, etc. In this embodiment, the chips 107-407 may allow for communication between the various components, for example via waveguides such as waveguides 115. In some embodiments, the chips may be an element of or otherwise related to a communication interface such as communication interface 1510 and allow communication between the computing device 1500 and another electronic device.

EXAMPLES OF VARIOUS EMBODIMENTS

Example 1 includes a transceiver chip comprising: a substrate that includes substrate material; a first transceiver component positioned within the substrate; a second transceiver component positioned within the substrate; and a well material positioned between the first transceiver component and the second transceiver component, wherein the well material includes an n-doped or p-doped portion of the substrate material, and wherein the well material is to mitigate cross-talk between the first transceiver component and the second transceiver component.

Example 2 includes the transceiver chip of example 1, wherein the substrate material is silicon, a III-V material, glass, or ceramic.

Example 3 includes the transceiver chip of example 1, wherein the well material includes the substrate material doped with boron, arsenic, phosphorous, or gallium.

Example 4 includes the transceiver chip of example 1, wherein the well material is physically coupled with the first transceiver component and the second transceiver component.

Example 5 includes the transceiver chip of example 1, wherein the first transceiver component is a first transceiver and the second transceiver component is a second transceiver.

Example 6 includes the transceiver chip of example 1, wherein the first transceiver component is a transmit component, and the second transceiver component is a receive component.

Example 7 includes the transceiver chip of any of examples 1-6, wherein the first transceiver component and the second transceiver component are a first transceiver pair, the well material is a first well material, and wherein the transceiver chip further includes: a second transceiver pair that includes a third transceiver component and a fourth transceiver component, the third and fourth transceiver components positioned within the substrate; and a second well material positioned within the substrate and between the first transceiver pair and the second transceiver pair, wherein the second well material is to mitigate cross-talk between the first transceiver pair and the second transceiver pair.

Example 8 includes the transceiver chip of example 7, further comprising a plurality of through substrate vias (TSVs) positioned within the substrate between the first transceiver pair and the second transceiver pair, wherein the TSVs are to mitigate cross-talk between the first transceiver pair and the second transceiver pair.

Example 9 includes the transceiver chip of example 8, wherein the transceiver chip further includes a plurality of micro-vias that are coupled with the TSVs, wherein the micro-vias and the TSVs are to allow dissipation of heat from the first transceiver component or the second transceiver component.

Example 10 includes the transceiver chip of any of examples 1-6, wherein the first transceiver component is to transmit a signal through a waveguide.

Example 11 includes the transceiver chip of example 10, wherein the signal has a frequency in the millimeter-wave (mmWave) frequency range.

Example 12 includes the transceiver chip of example 10, wherein the signal has a frequency of at least one terahertz (THz).

Example 13 includes the transceiver chip of example 10, wherein the signal has a frequency between 300 gigahertz (GHz) and one terahertz (THz).

Example 14 includes the transceiver chip of any of examples 1-6, further comprising an interlayer dielectric (ILD) coupled with the substrate.

Example 15 includes an electronic device comprising: a package that includes a first waveguide; and a transceiver chip coupled with the package, wherein the transceiver chip includes: a first transceiver pair with a first transceiver component and a second transceiver component, wherein the first transceiver pair is electromagnetically coupled with the first waveguide, and the first transceiver pair is to send or receive an electromagnetic wave via the first waveguide; and a well material positioned between the first transceiver component and the second transceiver component, wherein the well material is to mitigate cross-talk between the first transceiver component and the second transceiver component; wherein the well material includes between 10e14 and 10e19 atoms of dopant per cubic centimeter of a substrate material.

Example 16 includes the electronic device of example 15, wherein the dopant is boron, arsenic, phosphorous, or gallium.

Example 17 includes the electronic device of example 15, is wherein the substrate material is silicon, a III-V material, glass, or ceramic.

Example 18 includes the electronic device of example 15, wherein the well material is physically coupled with the first transceiver component and the second transceiver component.

Example 19 includes the electronic device of any of examples 15-18, wherein the transceiver chip further includes: a second transceiver pair that includes a third transceiver component and a fourth transceiver component, wherein the second transceiver pair is electromagnetically coupled with a second waveguide of the package, and the second transceiver pair is to send or receive an electromagnetic signal via the second waveguide; and a second well material positioned between the first transceiver pair and the second transceiver pair, wherein the second well material is to mitigate cross-talk between the first transceiver pair and the second transceiver pair.

Example 20 includes the electronic device of example 19, wherein the transceiver chip further comprises a plurality of through substrate vias (TSVs) positioned between the first transceiver pair and the second transceiver pair, wherein the TSVs are to mitigate cross-talk between the first transceiver pair and the second transceiver pair.

Example 21 includes the electronic device of example 19, wherein the electromagnetic signal has a frequency greater than 30 gigahertz (GHz).

Example 22 includes a method comprising: forming, in a substrate of a transceiver chip, a portion of n-doped or p-doped silicon; placing, in the substrate, a first transceiver component; and placing, in the substrate, a second transceiver component; wherein the first transceiver component and the second transceiver component are electromagnetically shielded from one another by the portion of n-doped or p-doped silicon.

Example 23 includes the method of example 22, further comprising forming, in the substrate, a plurality of through substrate vias (TSVs), wherein the first transceiver component and the second transceiver component are electromagnetically shielded from one another by the TSVs.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated embodiments, including what is described in the Abstract, is not intended to be exhaustive or limiting as to the precise forms disclosed. While specific implementations of, and examples for, various embodiments or concepts are described herein for illustrative purposes, various equivalent modifications may be possible, as those skilled in the relevant art will recognize. These modifications may be made in light of the above detailed description, the Abstract, the Figures, or the claims.

The invention claimed is:

1. A transceiver chip comprising
a substrate that includes substrate material;
a first transceiver component positioned within the substrate, wherein the first transceiver component is to transmit a signal through a waveguide, and wherein the signal has a frequency of greater than 30 gigahertz (GHz);
a second transceiver component positioned within the substrate; and
a well material positioned between the first transceiver component and the second transceiver component, wherein the well material includes an n-doped or p-doped portion of the substrate material, and wherein the well material is to mitigate cross-talk between the first transceiver component and the second transceiver component.

2. The transceiver chip of claim 1, wherein the well material includes the substrate material doped with boron, arsenic, phosphorous, or gallium.

3. The transceiver chip of claim 1, wherein the well material is physically coupled with the first transceiver component and the second transceiver component.

4. The transceiver chip of claim 1, wherein the first transceiver component is a first transceiver and the second transceiver component is a second transceiver.

5. The transceiver chip of claim 1, wherein the first transceiver component is a transmit component, and the second transceiver component is a receive component.

6. The transceiver chip of claim 1, wherein the first transceiver component and the second transceiver component are a first transceiver pair, the well material is a first well material, and wherein the transceiver chip further includes:
 a second transceiver pair that includes a third transceiver component and a fourth transceiver component, the third and fourth transceiver components positioned within the substrate; and
 a second well material positioned within the substrate and between the first transceiver pair and the second transceiver pair, wherein the second well material is to mitigate cross-talk between the first transceiver pair and the second transceiver pair.

7. The transceiver chip of claim 6, further comprising a plurality of through substrate vias (TSVs) positioned within the substrate between the first transceiver pair and the second transceiver pair, wherein the TSVs are to mitigate cross-talk between the first transceiver pair and the second transceiver pair.

8. The transceiver chip of claim 1, further comprising an interlayer dielectric (ILD) coupled with the substrate.

9. The transceiver chip of claim 1, wherein the signal has a frequency in the millimeter-wave (mmWave) frequency range.

10. The transceiver chip of claim 1, wherein the signal has a frequency of at least one terahertz (THz).

11. The transceiver chip of claim 1, wherein the signal has a frequency between 300 gigahertz (GHz) and one terahertz (THz).

12. An electronic device comprising:
 a package that includes a first waveguide; and
  a transceiver chip coupled with the package, wherein the transceiver chip includes:
   a first transceiver pair with a first transceiver component and a second transceiver component, wherein the first transceiver pair is electromagnetically coupled with the first waveguide, and the first transceiver pair is to send or receive a first millimeter-wave (mmWave) electromagnetic signal via the first waveguide; and
   a well material positioned within a substrate between the first transceiver component and the second transceiver component, wherein the well material is to mitigate cross-talk between the first transceiver component and the second transceiver component;
   wherein the well material includes between 10e14 and 10e19 atoms of dopant per cubic centimeter of the substrate material.

13. The electronic device of claim 12, wherein the well material is physically coupled with the first transceiver component and the second transceiver component.

14. The electronic device of claim 12, is wherein the substrate material is silicon, a III-V material, glass, or ceramic.

15. The electronic device of claim 12, wherein the transceiver chip further includes:
 a second transceiver pair that includes a third transceiver component and a fourth transceiver component, wherein the second transceiver pair is electromagnetically coupled with a second waveguide of the package, and the second transceiver pair is to send or receive a second electromagnetic signal via the second waveguide; and
 a second well material positioned within the substrate between the first transceiver pair and the second transceiver pair, wherein the second well material is to mitigate cross-talk between the first transceiver pair and the second transceiver pair.

16. The electronic device of claim 15, wherein the second electromagnetic signal has a frequency greater than 30 gigahertz (GHz).

17. The electronic device of claim 16, wherein the transceiver chip further comprises a plurality of through substrate vias (TSVs) positioned between the first transceiver pair and the second transceiver pair, wherein the TSVs are to mitigate cross-talk between the first transceiver pair and the second transceiver pair.

18. A method comprising:
 forming, in a substrate of a transceiver chip, a portion of n-doped or p-doped silicon;
 placing, in the substrate, a first transceiver component that is to facilitate transmission of electromagnetic signals with a frequency greater than 30 gigahertz (GHz) through a waveguide; and
 placing, in the substrate, a second transceiver component;
 wherein the first transceiver component and the second transceiver component are electromagnetically shielded from one another by the portion of n-doped or p-doped silicon.

19. The method of claim 18, further comprising forming, in the substrate, a plurality of through substrate vias (TSVs), wherein the first transceiver component and the second transceiver component are electromagnetically shielded from one another by the TSVs.

* * * * *